(12) United States Patent
Miller

(10) Patent No.: US 8,392,288 B1
(45) Date of Patent: Mar. 5, 2013

(54) ADD-ON TO SOFTWARE APPLICATION TO IDENTIFY ELECTRONIC RECEIPT DATA

(75) Inventor: Terry Miller, Oceanside, CA (US)

(73) Assignee: Intuit Inc., Mountain View, CA (US)

( * ) Notice: Subject to any disclaimer, the term of this patent is extended or adjusted under 35 U.S.C. 154(b) by 244 days.

(21) Appl. No.: 12/844,629

(22) Filed: Jul. 27, 2010

(51) Int. Cl.
*G06Q 30/00* (2012.01)
(52) U.S. Cl. .................. 705/26.81; 705/26.1; 705/27.1; 705/30; 705/35
(58) Field of Classification Search ............. 705/26.1, 705/27.1, 26.81, 30, 35
See application file for complete search history.

(56) References Cited

U.S. PATENT DOCUMENTS

| | | | | |
|---|---|---|---|---|
| 6,487,540 | B1 * | 11/2002 | Smith et al. | 705/21 |
| 8,095,597 | B2 * | 1/2012 | Rawat et al. | 709/206 |
| 2001/0023402 | A1 * | 9/2001 | Flynn | 705/1 |
| 2003/0158819 | A1 * | 8/2003 | Scott | 705/65 |
| 2005/0131768 | A1 * | 6/2005 | Rodriguez et al. | 705/26 |
| 2005/0240482 | A1 * | 10/2005 | Ohkawa et al. | 705/24 |
| 2010/0250415 | A1 * | 9/2010 | Silva | 705/34 |

OTHER PUBLICATIONS

Billeo, Inc,: Billeo Launches Splendid Search at TechCrunch50 (Anonymous. Computer Technology Journal. Atlanta: Sep. 25, 2008. p. 255). Retrieved from Proquest Aug. 8, 2012.*

* cited by examiner

*Primary Examiner* — Courtney Stopp
(74) *Attorney, Agent, or Firm* — Vista IP Law Group LLP; Gary D. Lueck

(57) ABSTRACT

Identifying electronic receipt data with a plug-in to a software application. Consumer purchases from merchants may be confirmed with an electronic receipt or message, which may be displayed by or transmitted to a consumer computer on which a software application such as a web browser and/or e-mail client application executes. A plug-in to the software application receives data of the software application that displays or stores transaction confirmation data generated by a merchant. The plug-in analyzes the software application data to identify potential electronic receipt data and notifies the consumer of the identified electronic receipt data. The plug-in provides for a choice whether identified electronic receipt data should be transmitted to a host computer that collects, stores and organizes electronic receipt data using a receipt program and receipt database.

33 Claims, 13 Drawing Sheets

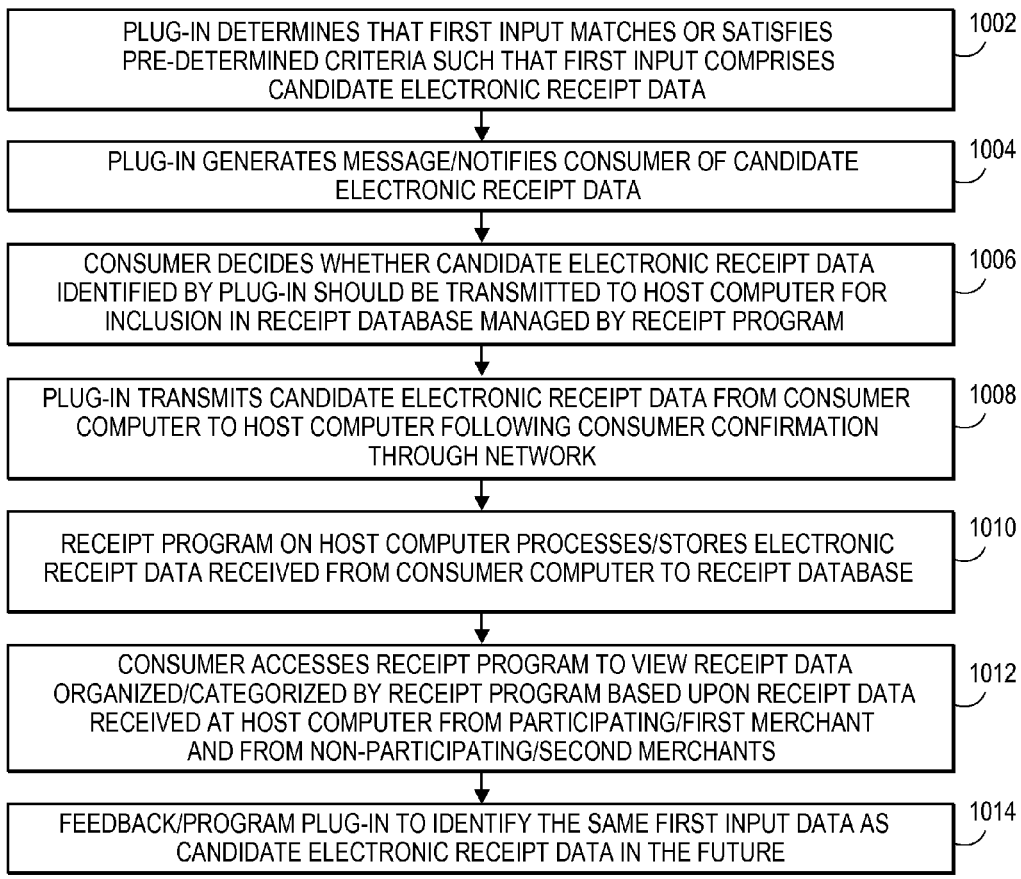

ADD-ON TO SOFTWARE APPLICATION TO IDENTIFY ELECTRONIC RECEIPT DATA

BACKGROUND

The invention is generally related to personal finance, and more particularly, to identifying and collecting electronic receipt or transaction data. Consumers purchase goods and services using various forms of payment including credit card, debit card, automated teller machine (ATM) card, check, automated clearing house (ACH) wire and cash. Certain transactions are debited from consumer bank accounts. For example, a checking or savings account may be debited when a consumer pays for a good or service with a debit card. A credit card may also be used for payment by the consumer. Debit and credit card transactions appear as line items within their respective accounts.

For certain types of transactions, consumers can access their respective on-line accounts to view their statements and transaction information. The transaction information that is available, however, is rather limited since line item entries may include only minimal information such as merchant name, transaction amount and transaction date. More informative lower or item level, or Level III receipt data, is not available to consumers when accessing their on-line checking or credit card accounts.

Receipt collection programs such as QUICKRECEIPTS of hosts such as Intuit Inc. have been developed to collect electronic receipt data from merchants from whom goods and services were purchased by consumers. QUICKRECEIPTS is a registered trademark of Intuit Inc. A consumer registers with the host and is associated with an identifier such as a number of receipt program member card, a club or discount card or a card of the merchants, and merchants join or participate in the receipt collection service such that they provide electronic receipt data generated by respective payment or transaction processing devices of respective member merchants to the host computer, e.g., daily, weekly or at other times. When a consumer purchases an item from a participating merchant using the receipt program member card, a club or discount card or a card of the merchant, the electronic receipt data that is generated by the merchant is associated with the consumer, and that receipt data is sent to the host computer and stored to the data repository with that consumer association by the receipt program. The receipt program collects, organizes and stores receipt data such that consumers who log onto their accounts with the host can view their receipts and information such as purchase date and amount and low or item level or Level III receipt data such as quantity of items purchased, item description, item product code, item model or serial number, an image of the item, form of payment, payment card number, purchase price, tax, total, order or transaction number, information about returns and warranties, the particular store (e.g., address or store number) from which the item was purchased, etc.

The receipt program is used to collect, organize and store electronic receipt data to the receipt database or repository, which may include electronic receipt data of multiple consumers and multiple merchants who register with the host. Later, a consumer logs onto his or her account with the host, and the receipt program retrieves electronic receipt data for that consumer to allow the consumer to view collected electronic receipt data using the receipt program, which may be used to track spending for the past week or month, identify and analyze spending categories and for returns and warranty claims.

While receipt programs such as QUICKRECEIPTS provide significant advances compared to limited line item transaction summaries, the effectiveness of such receipt programs relies in part upon the electronic transaction or receipt data provided to the host and processed by the receipt program. For example, consumers may purchase goods and services from merchants who do not participate in the receipt data collection service such that the host does not receive their electronic transaction data. Consequently, receipt programs may collect, organize and store a portion of available electronic transaction data when consumers purchase goods and services from non-participating merchants, thereby causing data generated by the receipt program to be based on a subset of electronic transaction data.

SUMMARY

Embodiments are related to identifying electronic transaction or receipt data generated by merchants that do not transmit their electronic transaction data to a host of a receipt program that is used to collect, organize and store electronic receipt data in a receipt database or repository. For this purpose, embodiments utilize an add-on to a software application such as a plug-in to web browser, a plug-in to a client e-mail application or other software program that utilizes an application program interface (API) of the software application to identify data of a sales confirmation or receipt displayed by, sent to and/or stored by the web browser and/or client e-mail application. The plug-in is triggered to notify the consumer upon detecting identified electronic receipt data and to present the consumer with an option of adding the identified electronic receipt data to a receipt database managed by the receipt program. Thus, with embodiments, electronic transaction data generated by merchants and sent to consumers can be identified with the plug-in and sent to the host computer without the merchant participating in the receipt collection service and without merchant knowledge. In this manner, embodiments can significantly expand the sources of electronic transaction data and improve the accuracy and effectiveness of receipt programs that collect, organize and store electronic transaction data.

One embodiment is directed to a method for identifying electronic receipt data for inclusion in a receipt database comprising respective receipt data of respective consumers that is collected, stored and organized by a receipt program executing on a host computer. The method comprises receiving data of a software application executing on computing apparatus of a consumer as a first input to an add-on program to the software application. The add-on program is operable to communicate with or initiate communications with the receipt program. The method further comprises identifying, with the add-on program, candidate electronic receipt data within the data that is stored or displayed by the software application, and displaying, with the add-on program, a message on a screen of the consumer computing apparatus to notify the consumer of the identified candidate electronic receipt data. The message presents the consumer with an option of storing the identified candidate electronic receipt data to the receipt database. A second input is received at the add-on program indicating whether the identified candidate electronic receipt data should be stored to the receipt database. If so, the identified candidate electronic receipt data is transmitted by the add-on program to the host computer and stored to the receipt database by the receipt program.

Another embodiment is directed to a method for identifying electronic receipt data for inclusion in a receipt database comprising respective receipt data of respective consumers that is collected, stored and organized by a receipt program executing on a host computer. The method comprises displaying data on a screen of a consumer computing apparatus and that may include electronic receipt data generated by a computing apparatus or payment processing device of a merchant. The method further comprises displaying an input element such as a toolbar element, button or menu item, generated by the add-on program within a user interface of the software application, and receiving an input to the add-on program, e.g., the consumer clicking on the input element using an input device of the consumer computing apparatus. The manual consumer input identifies electronic receipt data or indicates that the displayed data includes electronic receipt data that should be stored to the receipt database. In response to the second input, the add-on program transmits or initiates transmission of the manually identified electronic receipt data from the consumer computing apparatus to the host computer through a network, and the manually identified electronic receipt data is stored to the receipt database by the receipt program.

Another embodiment is directed to a method for collecting electronic receipt data of merchants who participate and do not participate in a receipt collection service managed by a host. In method embodiments, a receipt program executes on a computer of the host and is operable to collect, store and organize receipt data using a receipt database. The method comprises receiving, at the host computer and through a first network, first electronic receipt data generated by a first electronic payment processing device or first computing apparatus of a first merchant for a first purchase by a consumer from the first merchant who participates in the receipt collection service, and storing the first electronic receipt data in the receipt database using the receipt program. The method further comprises receiving, at the host computer and through a second network, second electronic receipt generated by a second payment processing device or second computing apparatus of a second merchant for a second purchase by the consumer from the second merchant who does not participate in the receipt collection service. The second electronic receipt data is transmitted from a computing apparatus of the consumer to the host computer using an add-on program to a software application executing on the consumer computing apparatus that displays or stores the second electronic receipt data. The second electronic receipt data is also stored in the receipt database with the first electronic receipt data using the receipt program.

Other embodiments are directed systems for identifying electronic receipt data and computer program products for implementing method embodiments. One embodiment is directed to system for identifying electronic receipt data for inclusion in a receipt database comprising respective receipt data of respective consumers that is collected, stored and organized by a receipt program executing on a host computer. The system comprises an add-on program to a software application executing on a computing apparatus of a consumer. The add-on program or another software program utilizes an application program interface (API) of the software application to communicate with the receipt program and to capture or receive data of the software application as a first input. The add-on program is further operable or programmed to identify candidate electronic receipt data stored or displayed by the software application, and is then triggered to display a message on a screen of the consumer computing apparatus to notify the consumer of the identified candidate electronic receipt data. The message presents the consumer with an option of storing the identified candidate electronic receipt data to the receipt database. The add-on program is further operable or programmed to receive a second input indicating whether the identified candidate electronic receipt data should be stored to the receipt database.

Another embodiment is directed to a system for identifying electronic receipt data for inclusion in a receipt database comprising respective receipt data of respective consumers that is collected, stored and organized by a receipt program executing on a host computer. The system comprises an add-on program to a software application that executes on a computing apparatus of a consumer and displays electronic receipt data that was generated by a computing apparatus or electronic payment processing device of a merchant. The add-on program is programmed or operable to display an input element within a user interface of the software application, receive an input comprising the consumer clicking on the input element utilizing an input device of the consumer computing apparatus to manually identify electronic receipt data that should be stored to the receipt database, and transmit the manually identified electronic receipt data from the consumer computing apparatus to the host computer through a network. The manually identified electronic receipt data is stored in the receipt database by the receipt program.

Yet another embodiment is directed to a system for collecting electronic receipt data of merchants who participate and merchants who do not participate in a receipt collection service managed by a host. The system comprises a host computer and an add-on program. The host computer comprises or accesses a receipt program and a receipt database. The receipt program is programmed or configured to collect, organize and store electronic receipt data to the receipt database, which includes respective electronic receipt data of respective consumers. The host computer is configured to receive, through a first network, first electronic receipt data generated by an electronic payment device of a first merchant who is a member of or participates in the receipt collection service for a first purchase by a consumer from the first merchant. The add-on program is an add-on to a software application executing on a computing apparatus of a consumer, the software application displaying or storing second electronic receipt data that was generated by a second electronic payment processing device or second computing apparatus of a second merchant for a second purchase by the consumer from the second merchant, the add-on program being operable to transmit second electronic receipt from the consumer computing apparatus to the host computer, wherein the second merchant does not participate in the receipt collection service, the host computer being operable to store the second electronic receipt data in the receipt database using the receipt program.

A further embodiment is directed to a computer program product comprising a non-transitory, computer readable storage medium having instructions which, when executed by a computer system, cause the one or more processors to execute a process for identifying electronic receipt data for inclusion in a receipt database comprising respective receipt data of respective consumers that is collected, stored and organized by a receipt program executing on a host computer. The process comprises receiving data of a software application executing on computing apparatus of a consumer as a first input, identifying candidate electronic receipt data stored or displayed by the software application, displaying a message on a screen of the consumer computing apparatus to notify the consumer of the identified candidate electronic receipt data, the message presenting the consumer with an option of storing the identified candidate electronic receipt data to the receipt database, and receiving a second input indicating whether the identified candidate electronic receipt data should be stored to the receipt database.

In another embodiment, the computer program product comprises instructions, which when executed, cause one or more processors to execute a process comprising displaying an input element within a user interface generated by a software application executing on a computing apparatus of a consumer, the software application displaying electronic receipt data that was generated by a computing apparatus or electronic payment processing device of a merchant, receiving an input comprising the consumer clicking on the input element to manually identify electronic receipt data that should be stored to the receipt database, and transmitting the identified electronic receipt data from the consumer computing apparatus to the host computer through a network, wherein the identified electronic receipt data is stored in the receipt database using the receipt program.

In a further embodiment, the computer program product comprises instructions, which when executed, cause one or more processors to execute a process comprising receiving, at the host computer and through a network, electronic receipt generated by an electronic payment processing device or computing apparatus of a merchant for a purchase by the consumer from the merchant, wherein the merchant does not participate in the receipt collection service. The process further comprises transmitting the electronic receipt data from a computing apparatus of the consumer to a host computer that comprises or accesses a receipt program and a receipt database including electronic receipt data of multiple consumers.

In a single or multiple embodiments, the consumer computer or computing apparatus may be, for example, be a laptop computer, desktop computer, a tablet computing device or a mobile communication device such as a Smartphone. The software application executing on the consumer computer or computing apparatus may be a web browser, examples of which include, but are not limited to, GOOGLE, INTERNET EXPLORER, MOZILLA FIREFOX, etc., and a client e-mail application, an example of which includes MICROSOFT OUTLOOK. The add-on program may be a plug-in to the web browser utilizes an application program interface (API) of the software application to identify data of a sales confirmation or receipt displayed by, sent to and/or stored by the software application. In a single or multiple embodiments, the plug-in to a web browser may also be utilized to identify electronic receipt data within a screen of a web-based electronic mail (e-mail) application that is accessed through a web browser. Examples of web-based e-mail applications include, but are not limited to, HOTMAIL, GMAIL, AOL and YAHOO! Mail.

In a single or multiple embodiments in which the software application is a client e-mail application that executes on the first or consumer, the add-on program is a plug-in to the client e-mail application and identifies electronic receipt data that is displayed within an open e-mail or within closed e-mails that may be stored in one or more folders. For this purpose, the plug-in can be configured to scan or capture data of stored e-mails upon initial activation to identify electronic transaction data in one or more e-mails in one or more folders. The add-on may also be configured to scan or capture data of stored e-mails periodically or in response to a user request.

In a single or multiple embodiments, when electronic receipt data is identified by the add-on program, the add-on program is triggered to notify the consumer, e.g., through a message or pop-up window displayed on the consumer computing apparatus. The message informs the consumer that potential or candidate electronic transaction data has been identified, and the consumer may select whether the identified data should be added to a receipt database. The add-on program, upon receiving data of the consumer's selection that the identified candidate electronic transaction data should be added to the receipt database, transmits the identified electronic transaction data from the consumer computer to the host computer through a network, and the receipt program executing on or accessed by the host computer stores the identified electronic transaction data to the receipt database. The added receipt data may then be part of the organization, categorization and other processing performed by the receipt program.

In a single or multiple embodiments, the add-on program comprises a feedback mechanism or learning capabilities such that if the consumer indicates that certain identified data should not be stored to the on-line receipt repository, that data is disregarded by the add-on program in the future such that the add-on program does not display a message presenting the consumer with an option of storing the identified electronic receipt data to the receipt database. Further, with the learning capabilities, the add-on program may analyze data confirmed by the consumer as being electronic receipt data to be included in the receipt database for other triggers, words or phrases other than the triggers that initially identified the electronic transaction data such that in the future, these additional triggers may be used to identify candidate electronic transaction data.

Thus, with embodiments, the add-on program may be used to capture or read data of a software application such as a web browser or client e-mail application executing on the consumer computing device in real time during an electronic transaction or immediately following completion of a transaction when a merchant payment device or computing apparatus displays or sends a receipt or confirmation.

In a single or multiple embodiments, the add-on program identifies electronic receipt data by comparing data displayed or stored by the software application and pre-determined criteria and determining whether the software application data comprises electronic receipt data based on least in part upon the comparison. For example, in one embodiment, the pre-determined includes certain or selected words, phrases, sequences of numbers, logos, images or learned patterns of characters and/or numbers, are compared by the add-on program with data stored or displayed by the software application. If a match or a pre-determined number of matches exist, the add-on program is triggered to display the screen or page or portion thereof including the data that matches the pre-determined criteria. For example, the add-on program may compare software application data and pre-determined criteria indicating that an electronic transaction has been completed such as certain words such as "receipt," "confirmation," "return," "payment," "tax," and other terms indicating a completed transaction. As another example, the pre-determined criteria may involve certain numbers or sequences of numbers such as a portion of a credit card, a masked out portion of a credit card (e.g., "****" or "XXXX" expiration date, etc.

In a single or multiple embodiments, the consumer may manually identify or select data that is displayed or stored by a software application as electronic transaction data to be stored to a receipt database or repository, e.g., by clicking a button or icon generated by the add-on program and displayed within a user interface of the software application. In response, the add-on program transmits the electronic transaction data identified by the consumer to the host computer, and the receipt program stores the received electronic transaction data to the on-line receipt repository or database.

In one or more embodiments, the receipt program with which the add-in program communicate, is accessible by the consumer for use in viewing and organizing electronic receipt data managed by the receipt program. For this purpose, the receipt program may generate a user interface that includes a thumbnail arrangement of discrete objects that represent respective electronic receipts collected from electronic payment devices of merchants who are members of the receipt collection service and provide their transaction data to the host of the receipt program, and, with embodiments, from the add-on program, which identifies electronic receipt data generated by merchants who are not members of the receipt collection service.

For example, the receipt program with which the add-on program interfaces may display an arrangement of discrete objects representing receipts to provide a snapshot or dashboard view or summary of consumer spending to allow the consumer to quickly visualize spending activity and to identify spending patterns while providing particular details regarding spending and receipts. Discrete objects may be selected by the consumer to display item level or Level III data such as product description, item number, brand, price, size or style, color, UPC code, quantity, manufacturer, etc., which may be utilized by the receipt program to categorize receipt data and display data related to categorized receipt data to the consumer. Thus, with embodiments, electronic receipt data from additional sources may be collected by the receipt program to provide a more comprehensive view of electronic receipt data.

BRIEF DESCRIPTION OF THE DRAWINGS

The foregoing and other aspects of embodiments are described in further detail with reference to the accompanying drawings, wherein:

FIG. 9 is a flow chart of method steps performed by a plug-in when data of the software application does not match or satisfy pre-determined criteria;

FIG. 10 is a flow chart of method steps performed by a plug-in when data of the software application does match or satisfy pre-determined criteria;

DETAILED DESCRIPTION OF ILLUSTRATED EMBODIMENTS

Embodiments are related to identifying electronic transaction or receipt data generated by merchants who do not transmit their electronic transaction data to a host of a receipt program that is used to collect, organize and store electronic receipt data in a receipt database or repository. For this purpose, embodiments utilize an add-on to a software application such as a plug-in or other software program to a web browser or a client e-mail application that reads or captures data displayed or stored by the software application and identifies data that is a candidate to be an electronic receipt by comparing displayed or stored data to pre-determined criteria indicating a completed transaction.

Figure 1:
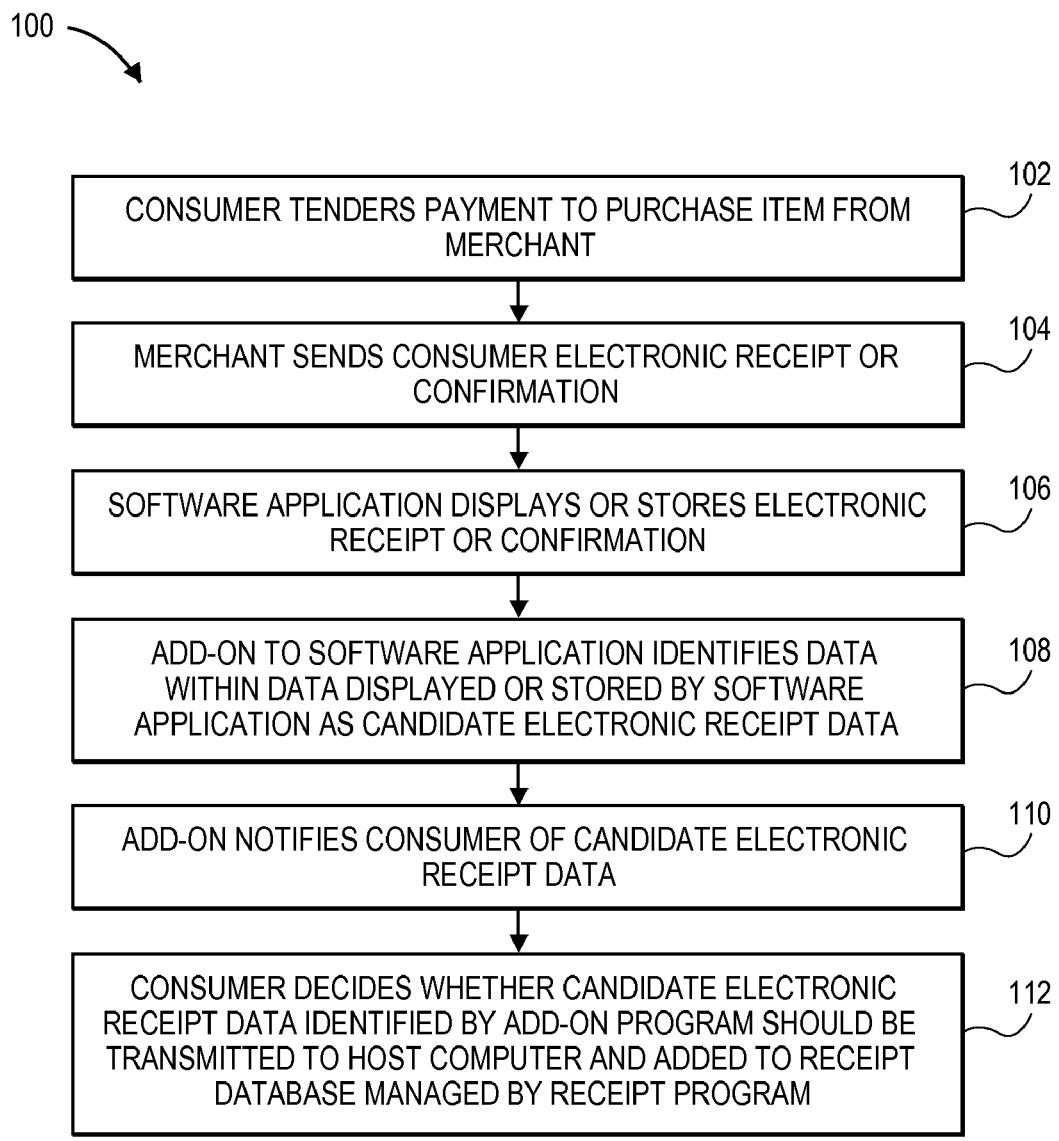
FIG. 1 is a flow chart of steps of one embodiment of a method for identifying candidate electronic transaction data sent from a merchant to a consumer computer utilizing an add-on such as a plug-in to a software application that executes on the consumer computer.

For example, referring to FIG. 1, a method 100 for identifying potential or candidate electronic receipt or transaction data (generally, electronic receipt data) comprises, the consumer tendering payment to purchase an item, good or service (generally, item) from a merchant at step 102, and the merchant sending the consumer an electronic receipt or confirmation at step 104. At step 106, a software application executing on a computer of the consumer displays or stores data including the electronic receipt or confirmation, and at step 108, an add-on such as a plug-in or other software program to the software application that utilizes application program interfaces (APIs) of the software application analyzes displayed and/or stored data to determine whether displayed or stored data may be or may include electronic receipt data. If potential or candidate electronic receipt data is identified, the add-on is triggered to notify the consumer at step 110. At step 112, the consumer decides whether the candidate electronic receipt data identified by add-on program should be transmitted to host computer and added to receipt database managed by receipt program, or the add-on can add the identified data to the receipt database automatically.

Thus, with embodiments, electronic transaction data from merchants can be identified and sent to the host computer with the add-on without the merchant participating in the receipt collection service and without knowledge of the merchant, thereby expanding the sources of electronic transaction data and the accuracy and effectiveness of receipt programs that process electronic transaction data. Receipt programs with additional electronic receipts can perform more comprehensive analyses of the receipt data. Embodiments and aspects thereof are described in further detail with reference to FIGS. 2-14.

Figure 2:
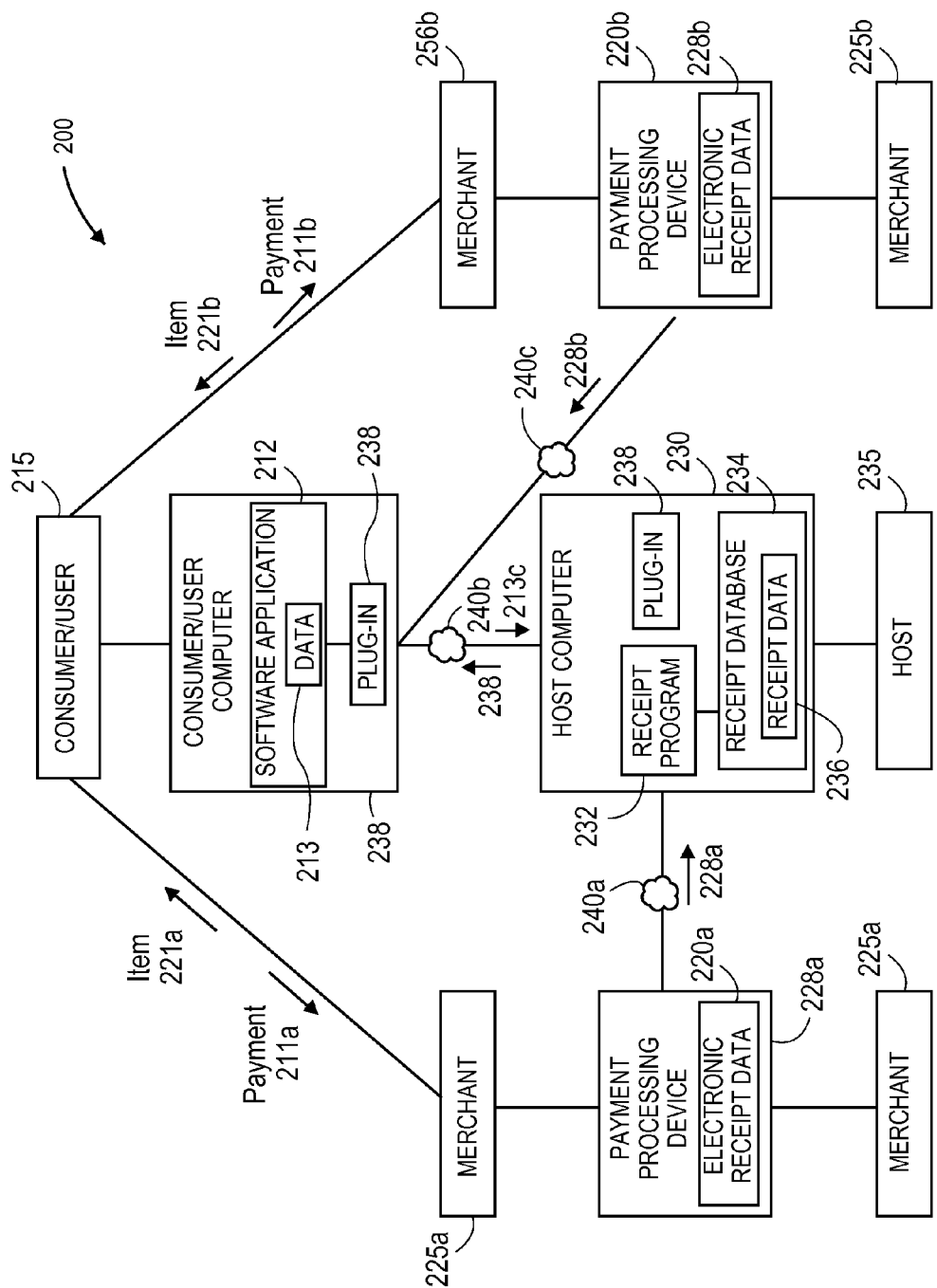
FIG. 2 illustrates one embodiment of a system for identifying candidate electronic transaction data sent from a merchant to a consumer computer utilizing an add-on such as a plug-in to a software application that executes on the consumer computer.

Referring to FIG. 2, a system 200 constructed according to one embodiment for identifying electronic receipt data comprises or involves a consumer 215 who utilizes a computing apparatus 210, one or more merchants 225a,b (two merchants 225 are illustrated for ease of explanation) that process transactions with respective payment processing devices or computing devices 227a,b that generate receipt data 228a,b, and a host 235 of a receipt collection service in which merchants provide electronic receipt data to the host or intermediate computer 230.

In the embodiment illustrated in FIG. 2, the host computer 230 hosts a receipt program 232 and a receipt database or repository 234 (generally, receipt database). The receipt program 232 and/or receipt database 234 may also reside on a remote computer (not illustrated in FIG. 2) that can be accessed by the host computer 230 through a network. The receipt database 234 stores electronic receipt data 236, e.g. item level or Level III data, of a plurality of consumers (one consumer 215 is shown for ease of explanation). The receipt program 234 is operable to collect, organize and store item level receipt data 236 and may be utilized to present receipt data 236 to consumers 115 so that consumers 215 can, for example, analyze their spending, view spending categories, observe spending patterns, spending on certain items and purchases from certain merchants. Further, with item level or Level III data, the receipt program 232 can be used to collect receipt data 236 that may be utilized to monitor timeframes for returns and warranty periods.

One example of a receipt program 232 that may be utilized in embodiments is QUICKRECEIPTS, of Intuit Inc. Further details regarding QUICKRECEIPTS are described in U.S. application Ser. No. 12/609,922, filed Oct. 30, 2009, the contents of which are incorporated herein by reference as though set forth in full. It should be understood, however, that other receipt programs 232 may be utilized in embodiments and that QUICKRECEIPTS is provided as one example of a receipt program 232 that may be utilized in embodiments.

According to embodiments, the host computer 230 includes or accesses an add-on 238 to a software application 212 executing on the consumer computer 210 such as a plug-in or other software program added to the software application 212 that utilizes an application program interface (API) of the software application 212 to provide additional, specific functionality or capabilities to the software application 212. The add-on 238 is operable to capture, scan or read data 213 of the software application 212 to determine whether the data 213 includes potential or candidate ("c") electronic receipt or transaction data or receipts (generally, candidate electronic receipt data 213c) such that the identified candidate electronic receipt data 213c can be added to the receipt database 234 so that the receipt program 232 can perform a more comprehensive receipt data 236 analysis.

Figure 3:
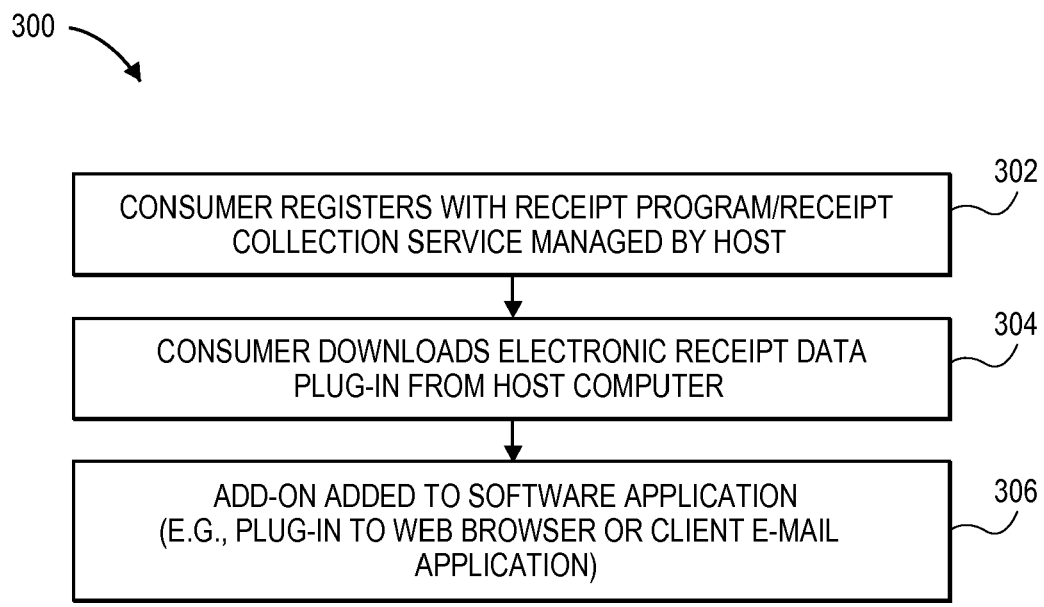
FIG. 3 is a flow chart of method steps for downloading an add-on program to the consumer computer for use in embodiments.

Referring to FIG. 3, a method 300 for identifying candidate electronic receipt data 213c utilizing the system 200 shown in FIG. 2 comprises, at stage 302, the consumer 215 registering with the receipt program or receipt collection service managed by host 235. For this purpose, the consumer 215 may create an account or register with the host 215 by providing information such as name, e-mail address, user ID and password and receipt program card, membership card or other club card number for merchants 225a who participate in the receipt collection service by providing their electronic receipt data 228a generated by a payment processing device 227a to the host computer 230 via a network 240a. In this manner, when the consumer 215 purchases an item 211 from the merchant 225a using the card identifier, the electronic receipt data 228a generated by the merchant 225a will be linked to the consumer 215. Further aspects of one example of a registration process are described in U.S. application Ser. No. 12/609,922, the contents of which were previously incorporated herein by reference.

Examples of a network 240a and other networks 240 disclosed herein that may be used for communications between system 200 components include but are not limited to a Local Area Network (LAN), a Wide Area Network (WAN), Metropolitan Area Network (MAN), a wireless network, other suitable networks capable of transmitting data, and a combination of such networks 240. For ease of explanation, reference is made to a network 240 generally, but various networks 240, combinations of networks and communication systems, methods and protocols may be utilized in embodiments.

At step 304, the consumer 215 downloads the add-on such as a plug-in 238 from the host computer 230 (or from another source) to the consumer computing apparatus 210, and at step 306, the plug-in 238 is added to the software application 212. For this purpose, the consumer computing apparatus 210 communicates with the host computer 230 through a network 240b and downloads the plug-in 238 from the host computer 230.

The consumer computing apparatus 230 may be a desktop computer, laptop computer or other computing device such as a tablet computing device or mobile communication device such as a cellular telephone or Smartphone capable of wireless or cellular communication. For ease of explanation, reference is made generally to a consumer computer 210, which is defined to include computers and mobile and tablet computing devices capable of communicating with the host computer 230.

According to one embodiment, as illustrated in FIGS. 2 and 3, the add-on 238 is a plug-in to the software application 212. In one embodiment, the software application 212 is a web browser, and the add-on 238 program is a plug-in to the web browser that adds receipt data detection capabilities to the web browser, which may be used to display receipt or confirmation data or access a web-based e-mail application with a receipt or confirmation message. Examples of web browsers that may be utilized in embodiments include, for example, INTERNET EXPLORER, GOOGLE CHROME, MOZILLA FIREFOX. In another embodiment, the software application 212 is a client e-mail application, and the add-on 238 is a plug-in to the client e-mail application that adds receipt data detection capabilities to the client e-mail application. An example of a client e-mail application includes MICROSOFT OUTLOOK. Such plug-ins 238 and software applications 212 may execute on various types of consumer computing devices 210 including computers and mobile communication devices such as Smartphones. For ease of explanation, reference is made generally to a plug-in 238 to a software application 212 executing on a client computer 210.

Figure 4:
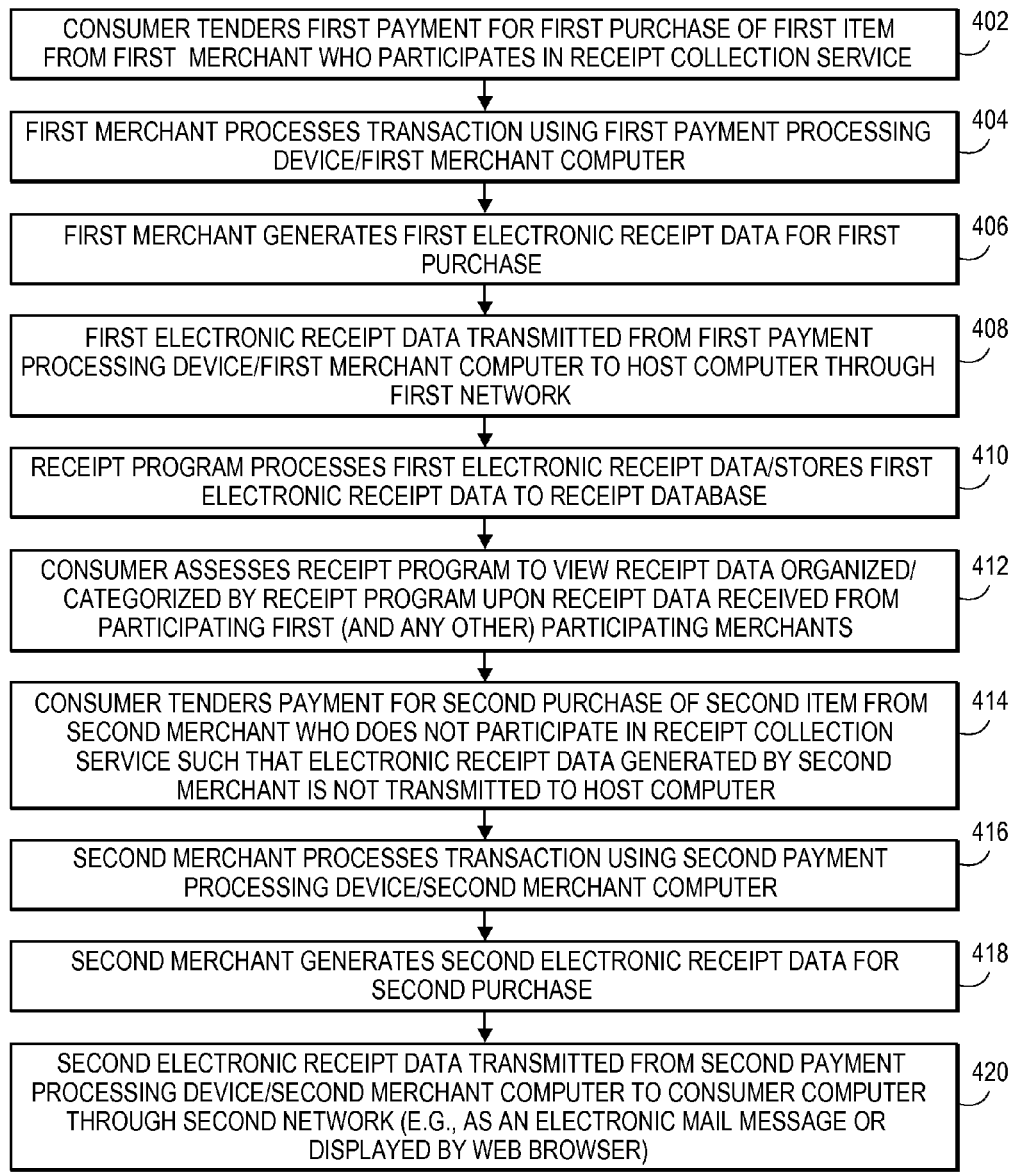
FIG. 4 is a flow chart of method steps of a consumer purchasing an item from merchants who participate in a receipt collection service by providing the electronic transaction data to the host computer and from merchants who do not participate and do not provide their electronic transaction data to the host computer.

Referring to FIG. 4, having downloaded the plug-in 238 to the consumer computer 210, at step 402, the consumer 215 proceeds to purchase various items, goods and services (generally, item 221) from respective merchants 125a,b. References to an "item 221" are defined to include goods and services, and references to "merchant" are defined to include merchants who offer and sell goods and services, including in-store or brick and mortar merchants and on-line merchants that sell items through respective websites. Various items 221 may be purchased by the consumer 215, and the consumer 215 may purchase one or multiple items 221 from each merchant 225. Examples of items 221 include, but are not limited to, home or house wares, groceries, electronics, home repair, healthcare or personal hygiene items, clothing, business items, books, etc. It should be understood that embodiments may and can involve various types of items 221, various types and numbers of merchants 220, including two merchants 225a-b in the illustrative example shown in FIG. 4.

During a first transaction ("first" referring to the first transaction described and not necessarily the first transaction in time), at stage 402, the consumer 210 tenders a form of payment 211 to purchase one or more items 221 from a first merchant 225a. Payment may be made using a transaction card (e.g., credit card, debit card, gift card, etc.), check, cash and other forms of payment. Depending on the form of payment 211, the merchant 125a processes the transaction with a transaction or payment processing device 127a (generally, payment processing device 127) such as a Point of Sale (POS) payment terminal, cash register, computer, scanner system, etc. At stage 404, the merchant 225a process the transaction utilizing the payment processing device 127a and at stage 406, generates and stores electronic receipt data 128a. The merchant 125a may also generate a paper receipt that is provided to the consumer 215. The receipt data 128a may include a name of the merchant 125a, a transaction date, a transaction amount, and information related to the form of payment 211 (e.g., credit card number or partial credit card number).

At stage 406, first electronic receipt data 128a is transmitted from the payment processing device 127a of the participating merchant 125a to the host computer 230, which collects or aggregates receipt data 236 of various consumers from respective merchants within a receipt database 238. One example of a host computer 230 that may be utilized for this purpose is a computer or server of Intuit Inc. For this purpose, the payment processing device 127a is operably coupled to or in communication with the host computer 130 via a network 240b.

Electronic receipt data 128a may be sent from the payment processing device 127a of the participating merchant 125a to the host computer 130 periodically (e.g., daily or weekly), in response to a request for receipt data from the receipt program 232 that executes on the host computer 230. The receipt program 232 may be implemented as hardware, software or a combination thereof, but reference is made to a receipt program 232 for ease of explanation. One example of a receipt program 232 that may be utilized in embodiments is QUICKRECEIPTS of Intuit Inc., and in the embodiment illustrated in FIG. 2, the host computer 230 may be a QUICKRECEIPTS Server.

With continuing reference to FIG. 4, at step 410, the receipt program 232 processes the first electronic receipt data 128a and stores the data to the receipt database 234. At step 412, the consumer 215 using the consumer computer 210 may access the host computer 230 to utilize the receipt program 232 and view receipt data organized/categorized by the receipt program 232 based upon the electronic receipt data received from participating first (and any other) participating merchants 125a.

For example, electronic receipt data 128a received from participating merchants 125a may be stored in a receipt database 132 that is structured as a table or other data structure that organizes receipt data according to consumer identification such as one or more of consumer name, QUICKRECEIPTS account identification number, social security number, e-mail address, transaction card number, store or rewards card number such as a BEST BUY card number or REWARDS ZONE card number, a number of a card associated with a universal receipt or loyalty program such as QUICKRECEIPTS, or other unique identifying information such as a supermarket club card number, e.g., a VONS card number or a RALPHS card number.

At step 414, the consumer 215 tenders payment 211b for second purchase of second item 221b from second merchant 225b who, unlike the first merchant 225a, does not participate in receipt collection service managed by the host 230 such that electronic receipt data 228b generated by the second merchant 225b is not transmitted to the host computer 230. At step 416, the second merchant 225b processes the transaction using a second payment processing device 127b, and at step 418, generates second electronic receipt data 228b for the second purchase. At step 420, the second electronic receipt data 228b is transmitted from the second payment processing device 227b to the consumer computer 210 through a network 240c, e.g., as an electronic mail message or displayed by a web browser.

Figure 5:
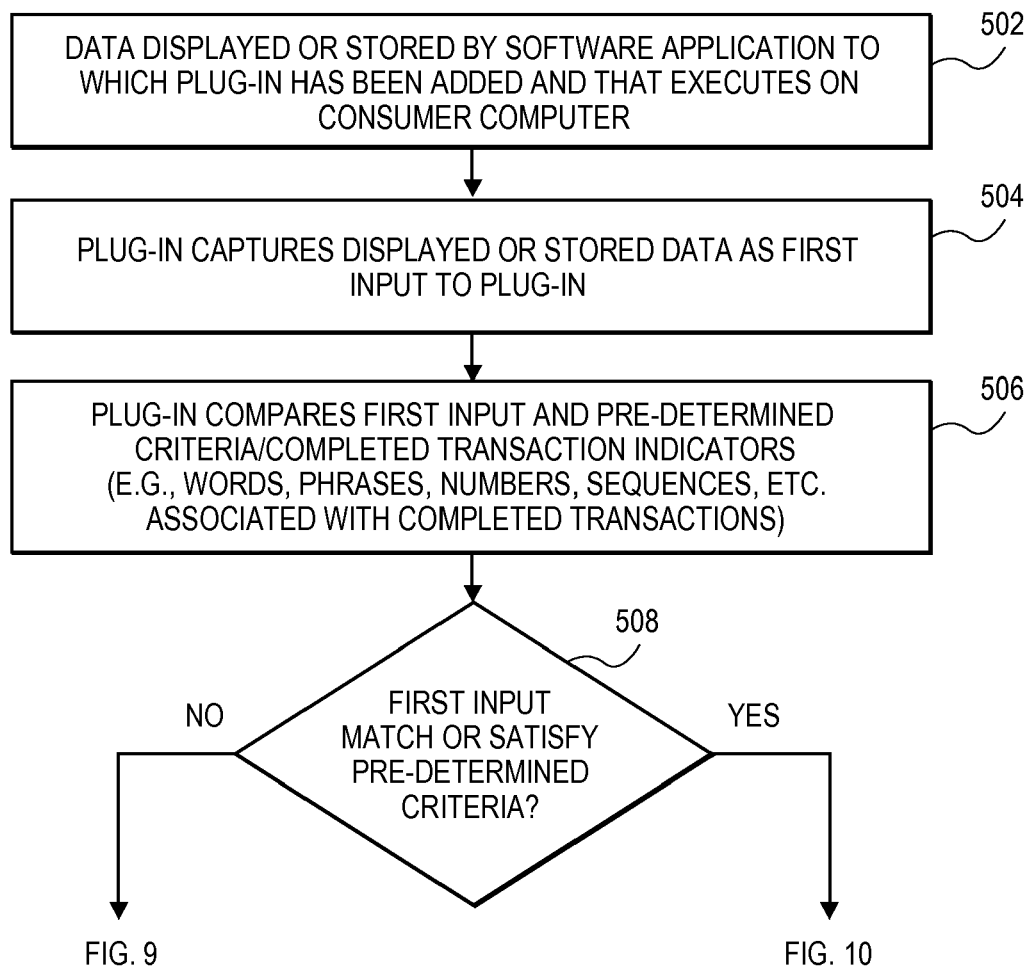
FIG. 5 is a flow chart of method steps performed by a plug-in to a software application including capturing data, comparing captured data to pre-determined criteria, and determining whether the captured data is candidate electronic transaction data.
Figure 6:
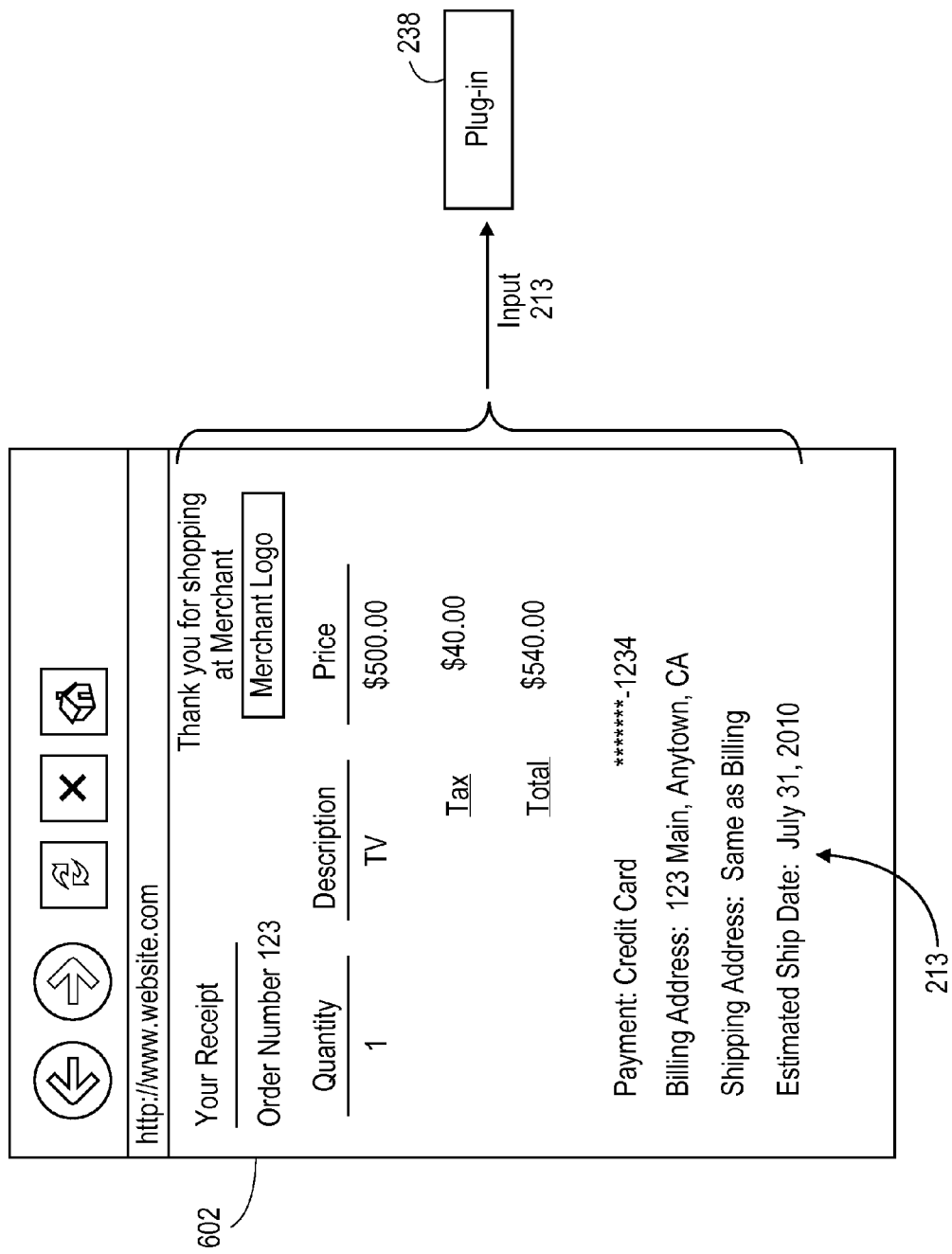
FIG. 6 illustrates components of or utilized by an add-on such as a plug-in to a software application according to one embodiment for identifying candidate electronic receipt data.
Figure 7:
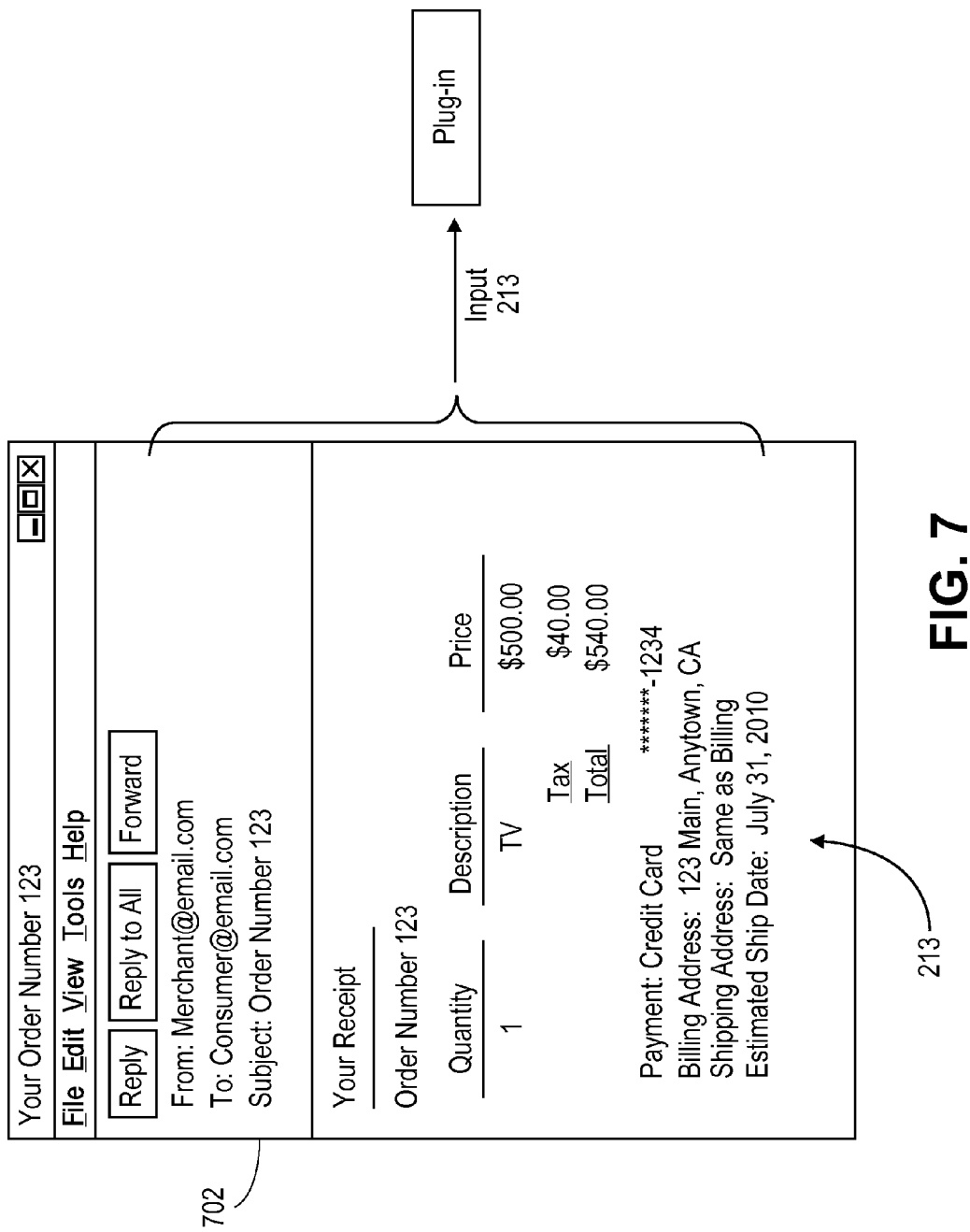
FIG. 7 generally illustrates a screen or page displayed by a web browser and data that may be read, captured or analyzed by a plug-in to a web browser.

Referring to FIG. 5, at step 502, data 213 is displayed or stored by the software application 212 to which plug-in 238 has been added and that executes on the consumer computer 210. For example, as generally illustrated in FIG. 6, data 213 displayed within a page or screen 602 of a web browser may include transaction and/or other data. FIG. 6 illustrates an example in which a receipt or purchase confirmation is displayed by a web browser and displayed data includes billing address, shipping address, quantity of items purchased, description, tax, order total, etc. As another example, referring to FIG. 7, data displayed within an electronic mail message 702 that is received at the consumer computer 210 with a client e-mail application may also include data 213 including receipt or purchase information data or message. Further, e-mail messages 702 may be stored within various folders of the client e-mail application including an Inbox folder and various folders created by the consumer. Thus, it should be understood that various software applications 212 executing on the consumer computer 210 may display data 213, and that some of the display screens 602, 702 may include data related to a transaction whereas others may not.

Figure 8:
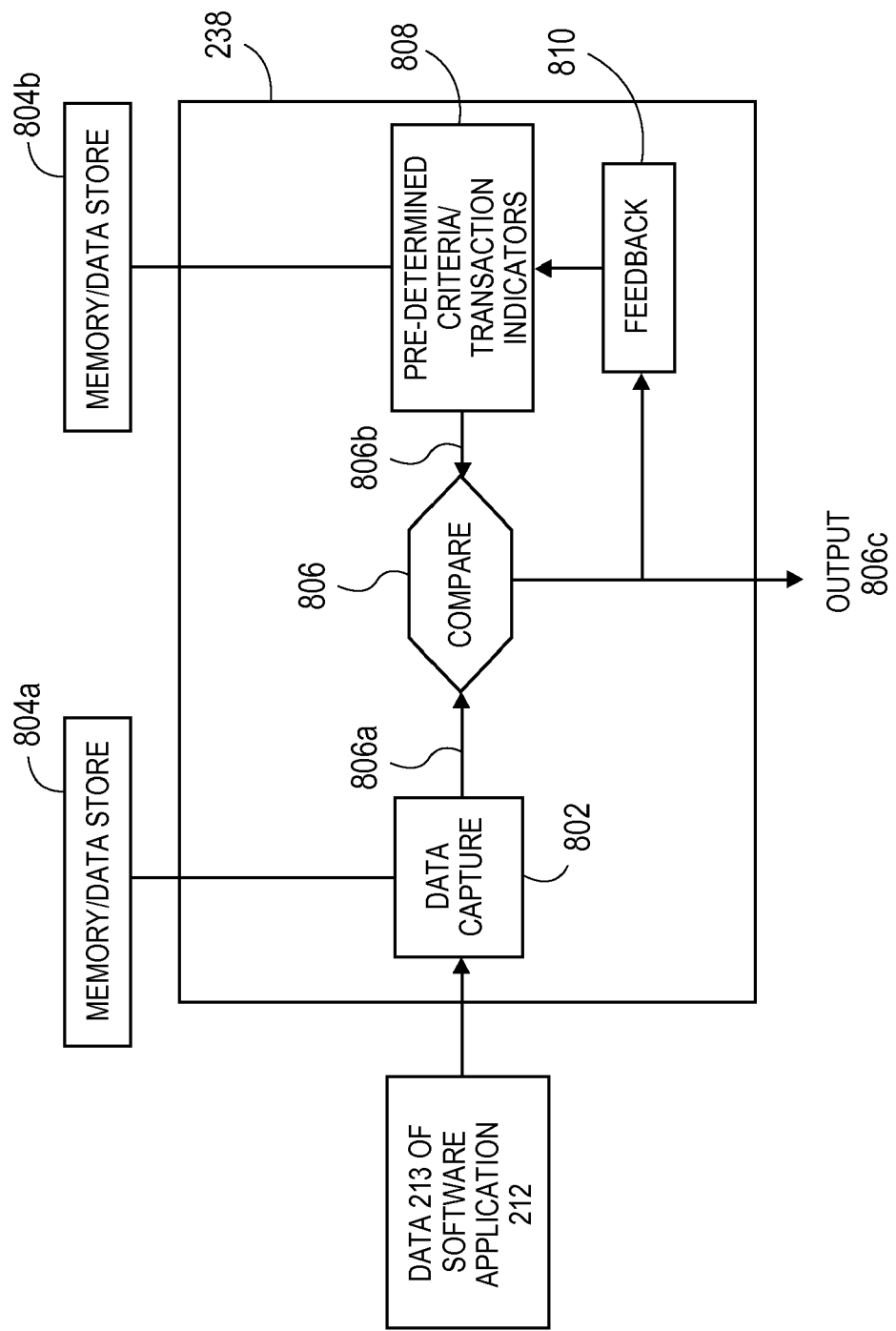
FIG. 8 generally illustrates an electronic mail message displayed by a client e-mail application data that may be read, captured or analyzed by a plug-in to a client e-mail application.

Referring again to FIG. 5, and with further reference to FIG. 8, as screens 602, 702 are displayed with the software application 212, the plug-in 238 captures or reads the displayed data 213 at step 504. More particularly, as shown in FIG. 8, one embodiment of a plug-in 238 includes a data capture element 802, a first data store or memory element 804a (generally, first data store 804a) for storing data 213 captured from one or more screens or messages 602, 702 displayed by the software application 212, a comparison element 806, and a second data store or memory element 804b for storing pre-determined criteria or indicators 808 of a completed transaction (generally, pre-determined criteria 808). As shown in FIG. 8, the memories or data stores 804a, 804b may be separate from the plug-in 238 (e.g., a memory or data store of the consumer computer 210), but other system configurations may be utilized.

Step 804 involves extracting, scanning, reading or scraping data 213 form a displayed screen, page or e-mail message 602, 702 by, for example, reading text within the page or an electronic file of the page, reading HTML codes or tags, screen or data scraping, object or shape recognition (e.g., to recognize certain images or logos), Optical Character Recognition (OCR) and other extraction, data scraping and character reading methods. Data 213 extracted or read from the displayed page 602 or message 702 may be stored in the first data store 804a as necessary.

At step 506, the compare element 806 of the plug-in 238 receives, as a first input 806a, the captured data from the first data store 804a and receives, as a second input 806b, pre-determined criteria 808 indicative of a completed transaction. The pre-determined criteria 808 may involve one or more and various combinations of words, phrases, numbers, characters, sequences of words and numbers, icons, symbols, logos, and tags or metadata, which are indicative of a completed transaction involving the consumer 215 and a merchant 225. Examples of such pre-determined criteria 808 include, but are not limited to, 1-800 and 1-888 (for toll free merchant numbers, e.g. for service or returns), payment and credit card terms and names such as "form of payment," "credit card number," "expiration date," "American Express," "Visa," "Master Card" and "Discover," partial credit card numbers indicating that payment was made with a particular credit card, and "cross-outs" to hide a portion of a credit card number (e.g., "****-" and "XXX-"), "billing," "billing address," delivery terms such as "deliver," "delivery date," "delivery time," "shipping," "shipping & handling," order confirmation terms such as "order," "order date," "order number," "tracking number," terms related to returning a purchased item such as "return" and "return policy," and warranty terms. Embodiments may involve pre-determined criteria involving a particular term, certain numbers of terms and different combinations of terms.

Thus, for example, step 506 may involve the compare element 806 comparing data captured from a page 602 displayed by a web browser to determine whether the data 212 displayed within the page includes certain terms or pre-determined criteria such as "tracking number" or "tracking number" and "return policy," which indicate that a transaction has been completed such that a determination may be made that the screen 602 displayed includes electronic receipt data. It should be understood that the pre-determined criteria 808 utilized may vary, and the above example is provided to generally illustrate how embodiments may be implemented with pre-determined criteria 808 in the form of words related to a completed transaction.

At stage 508, the plug-in 238 determines whether the first input 806a (data 213 of the software application 212) satisfies the pre-determined criteria 808 (e.g., whether the screen 602 of a web browser includes terms or phrases indicating a completed transaction). If not, then referring to FIG. 9, at step 902, the plug-in 238 determines that first input 806a does not satisfy pre-determined criteria 808, and at step 904, no alert or message is generated for the consumer 215 such that the analysis performed by the plug-in 238 is transparent to the consumer 215.

Figure 11:
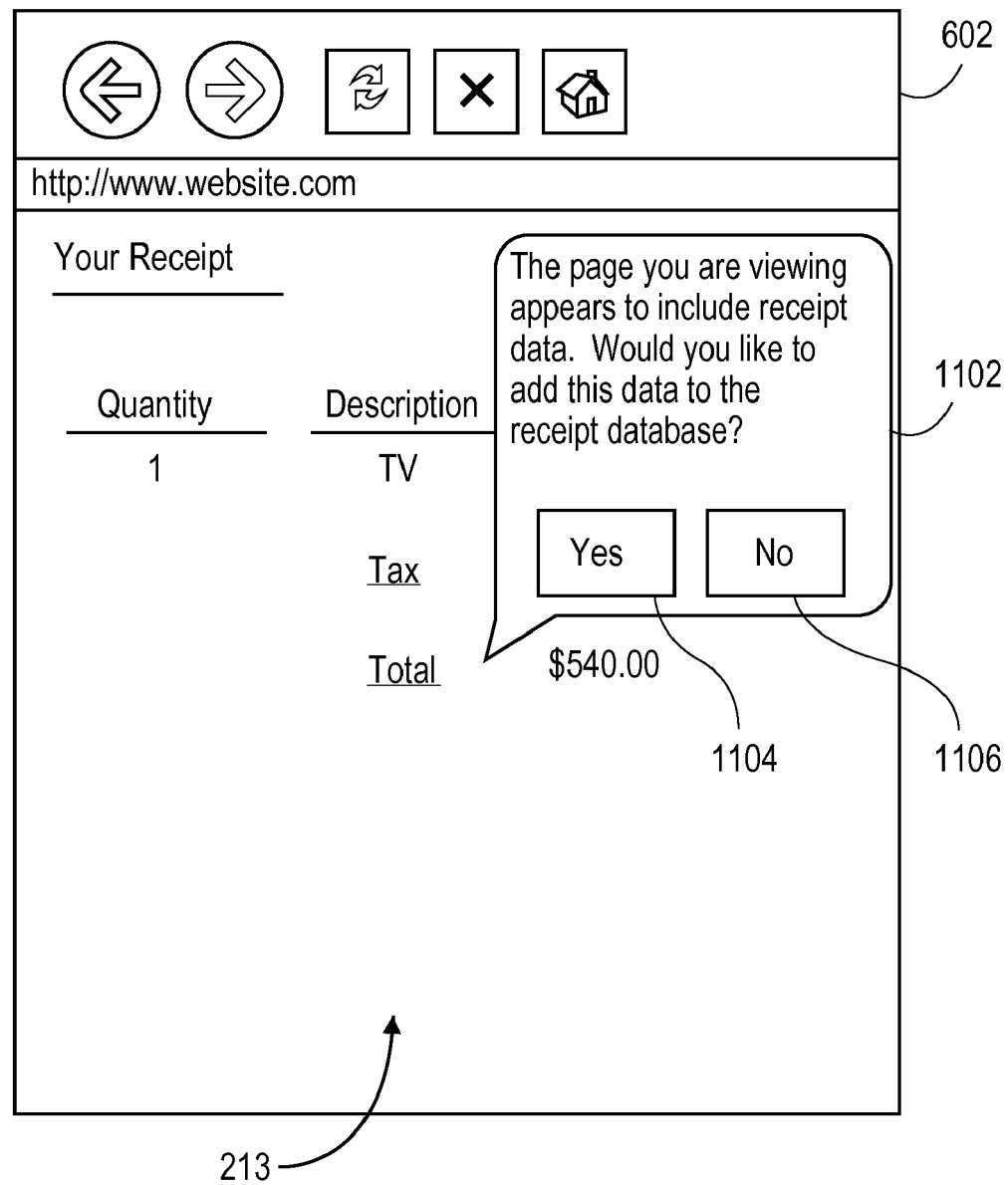
FIG. 11 illustrates one example of a message that may be generated by the plug-in in response to detecting candidate electronic receipt data.

However, if FIG. 5, stage 508 results in step 902, the plug-in 238 determining that the first input 806a (data 213 of the software application 212) satisfies the pre-determined criteria 808 as a result of including certain completed transaction indicators, then at step 1004, and with further reference to FIG. 11, the plug-in 238 is triggered to transform the input 806 of data 213 of the software application 212 into an output 806c, e.g., by generating a message 1102 that is displayed on the consumer computer 110 to the consumer 115 to notify the consumer 115 that potential or candidate electronic receipt data 213c has been identified within the screen or page of the software application 112. At step 1006, the consumer 115 decides whether candidate electronic receipt data 213c identified by the plug-in 238 should be transmitted to the host computer 130 for inclusion in the receipt database 234 (e.g.

with "yes" or "no" buttons 1104, 1106 within the message 1102). If not, then the message 1102 can be disregarded by pressing "no" 1104 or another suitable option presented in the message 1102. If so, then at step 1008, the plug-in 238 transmits or initiates transmission of the identified electronic receipt data 213c from the consumer computer 110 to the host computer 130 through the network 240b. At step 1010, the receipt program 238 processes the received electronic receipt data and stores it to the receipt database 234. At step 1012, the consumer 215 can use the consumer computer 210 to access the receipt program 232 and view receipt data 236 that is stored in the receipt database 234 and organized, e.g., categorized, by the receipt program 232 based upon receipt data received at the host computer 230 from the participating or member merchant(s) 127a and from non-participating or non-member merchants 127b. In this manner, embodiments expand the sources of electronic receipt data such that the receipt program 232 can perform a more comprehensive receipt data analysis.

At step 1014, in certain embodiments in which the plug-in 238 includes a feedback element 810 (as illustrated in FIG. 8), the feedback element 810 may be utilized to add and/or delete pre-determined criteria 808 that serves as the second input 806b that is compared with data of the software application 212. Adjustments to the pre-determined criteria 808 may, for example, be based at least in part upon whether the candidate electronic receipt data 213c identified was added to the receipt database 236. For example, candidate electronic receipt data 213c may be identified based on a certain terms and numbers being within the data 213 of the software application 212, and the consumer 215 may have added that candidate electronic receipt data 213c to the receipt database 236, thus indicating that the pre-determined criteria 808 that was utilized successfully identified candidate electronic receipt data 213c and should be utilized in the future. The feedback element 810 may also scan the successfully identified candidate electronic receipt data 213c for other terms that were not part of the comparison and that can be added to the pre-determined criteria 808 used in future comparisons. Thus, the plug-in 238 may be static in which case fixed pre-determined criteria 808 is utilized or dynamic or intelligent in which case the feedback element can adjust or fine tune the pre-determined criteria 810 utilized as the feedback element 810 learns and adapts.

Figure 12:
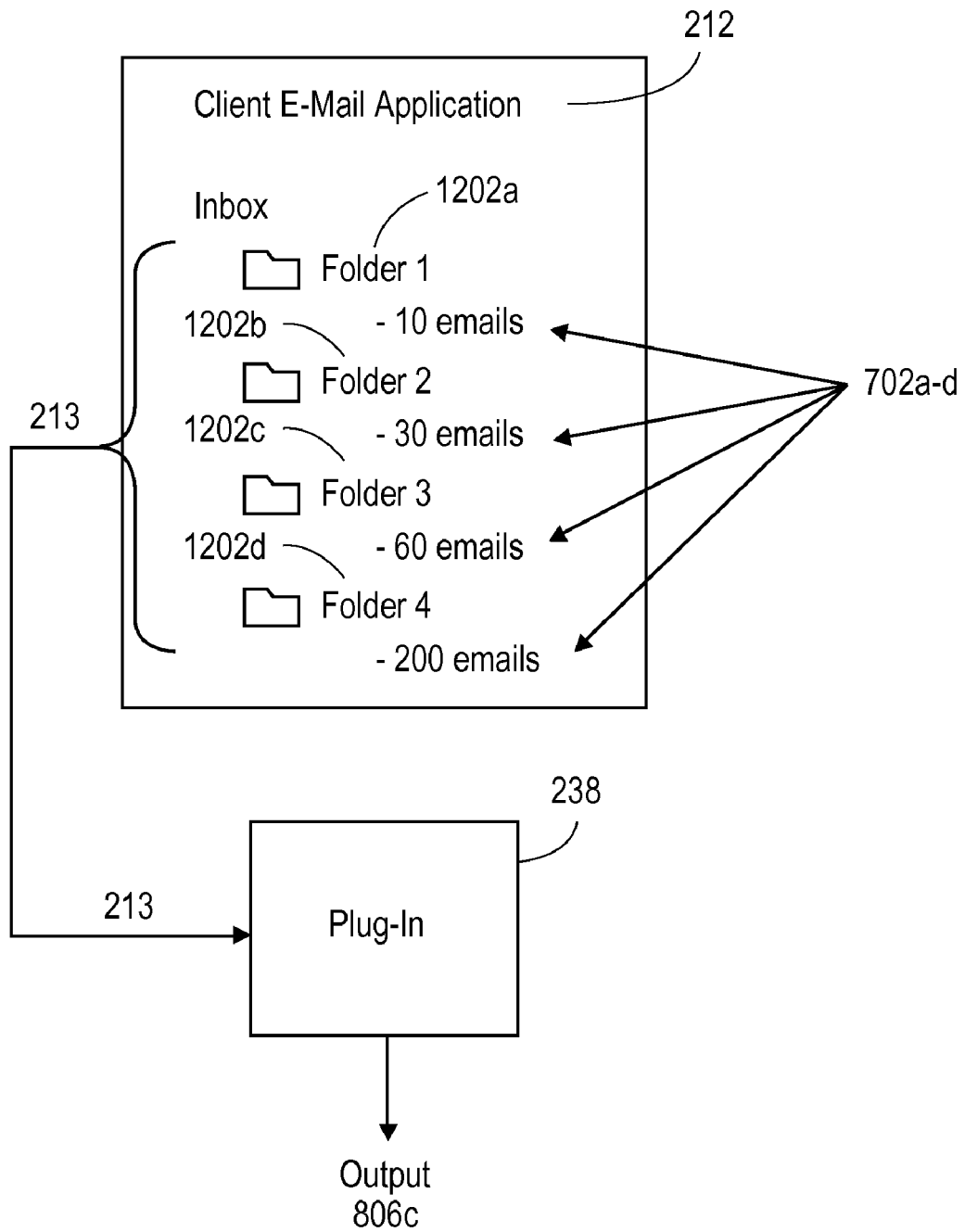
FIG. 12 illustrates how plug-in embodiments may be utilized to capture and analyze data from closed e-mails that are not displayed to the consumer and are stored in electronic mail folders of a client e-mail application.

While certain embodiments are described with reference to capturing data 213 displayed within a software application 212 such as a web browser or client e-mail application in which an electronic message 702 is opened, embodiments may also involve capturing data 213 that is not displayed. Referring to FIG. 12, a software application 212 such as a client e-mail application may be utilized to store electronic mails 702 in various folders 1202a-d (generally, folder 1202), e.g., an "Inbox" folder or a folder created and named by the consumer 215. With embodiments, the data capture element 802 of the plug-in 238 can be used to scan e-mails 702 that are stored within various folders 1202 to identify which e-mails 702 include potential or candidate electronic receipt data 213c.

For example, as shown in FIG. 12, the consumer 215 utilizes a client e-mail application executing on the consumer computer 210 to store 10 e-mails in Folder 1, 30 e-mails in Folder 2, 60 emails in Folder 3, and 200 e-mails in Folder 4. FIG. 5, step 504 may involve a first input 806a to the plug-in 238 by capturing or reading data 213 within stored electronic e-mails 702, and FIG. 5, step 506 may involve comparing those inputs 806a with a second input 806b of pre-determined criteria 808 such as certain words, phrases, etc. that indicate a completed transaction, as discussed above.

Thus, as an example shown in FIG. 12, the compare element 806 may compare electronic mail messages 702*a-d* within four folders 1202*a-d* and determine that electronic mail messages 1, 8 and 10 within Folder 1, electronic mail messages 10 and 22 in Folder 2, and electronic mail messages 2, 58 and 148 within Folder 4 include respective candidate electronic receipt data 213*c*. The plug-in 238, in response, is triggered to generate a message 1102 to the consumer 215 about these different candidate electronic transaction data 213*c* to allow the consumer 215 to confirm whether the identified e-mails include electronic receipt data that should be uploaded to the receipt database 234 managed by the receipt program 232.

Embodiments may involve capturing, reading or scanning e-mails 702 within e-mail folders 1202 at various times. In one embodiment, e-mail folders 1202 are scanned after the plug-in 238 is downloaded from the host computer 230 and added to the client e-mail program 212 (step 306) and initially executed. In this manner, candidate electronic receipt data 213*c* in all of the currently existing e-mails 702 of the client e-mail application are scanned by the plug-in 238 upon download and activation of the plug-in 238 such that subsequent scans of e-mails 702 by the plug-in 238 can be performed as electronic messages 702 are received/displayed, as they are stored, periodically, or in response to a request by the consumer 215.

Further, while certain embodiments are described with reference to a plug-in 238 to the software application 212 identifying candidate electronic transaction data 213*c*, other embodiments involve the consumer 215 indicating which pages, screens or e-mail messages 602, 702 displayed by a software application 212 include electronic transaction data.

Figure 13:
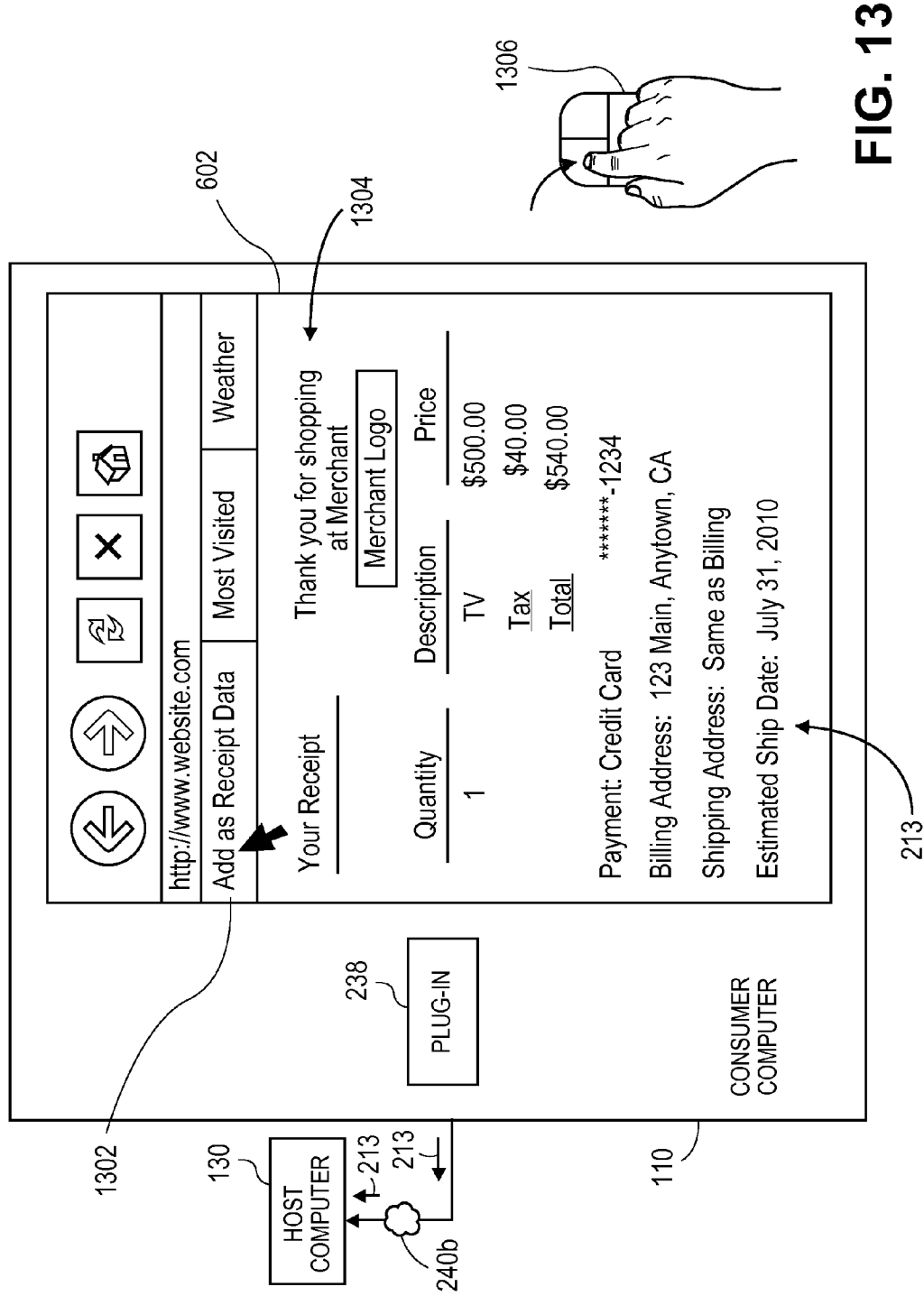
FIG. 13 illustrates another embodiment in which a plug-in to a software application adds an input element to the software application interface that can be selected by the consumer to manually indicate that data displayed by the software application should be added to the receipt database.

For example, referring to FIG. 13, a software application 212 of a web browser may display a page or screen 602 including a confirmation or receipt for a purchase by the consumer 215 from a merchant 225. In the event that the plug-in 238 does not identify the displayed data as candidate electronic data 213*c* (e.g., depending on the available or selected pre-determined criteria 808 utilized in the comparison, or if the plug-in 238 is deactivated), the consumer 215 can click an input element 1302 such as an icon, button, toolbar component or menu item displayed within a user interface 1304 of the software application using an input device 1306 of the consumer computer 210 such as a mouse or key on a keyboard to indicate that data within the displayed page, screen or message 602, 702 includes electronic receipt data that should be added to the receipt database 234. In this embodiment, the user input is provided as an input to the plug-in 238, which may then be activated if it is inactive, and the plug-in 238 then initiates transfer of the electronic receipt data from the consumer computer 210 to the host computer 230 where the receipt program 232 will add the consumer-selected electronic receipt data to the receipt database 234.

Figure 14:
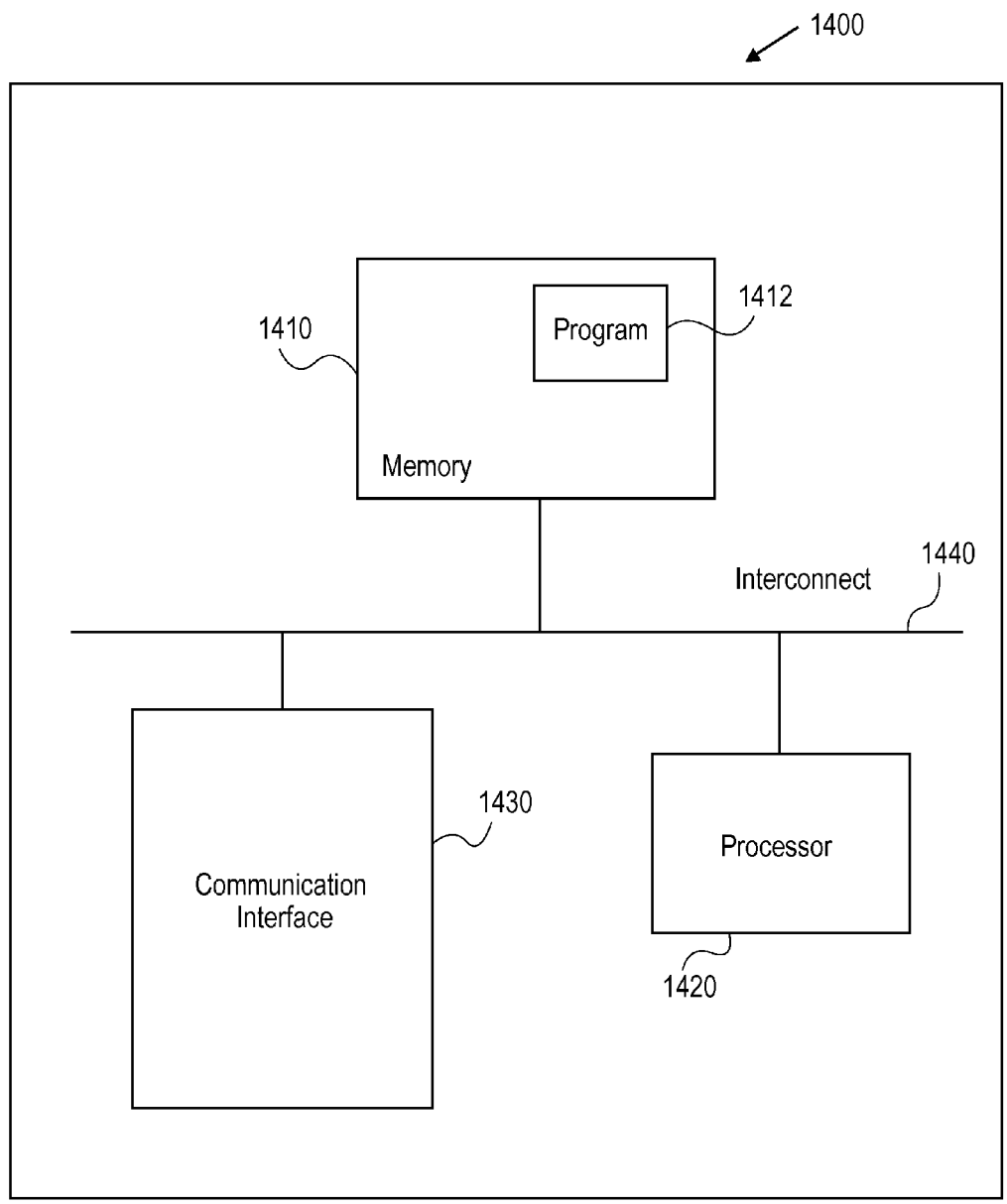
FIG. 14 is a block diagram of components of a computing apparatus or system in which various embodiments may be implemented or that may be utilized to execute various embodiments.

FIG. 14 generally illustrates components of a computing device 1400 that may be utilized to execute embodiments and that includes a memory 1410, account processing program instructions 1412, a processor or controller 1420 to execute account processing program instructions 1412, a network or communications interface 1430, e.g., for communications with a network or interconnect 1440 between such components. The memory 1410 may be or include one or more of cache, RAM, ROM, SRAM, DRAM, RDRAM, EEPROM and other types of volatile or non-volatile memory capable of storing data. The processor unit 1420 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1440 may include a system bus, LDT, PCI, ISA, or other types of buses, and the communications or network interface may, for example, be an Ethernet interface, a Frame Relay interface, or other interface. The network interface 1430 may be configured to enable a system component to communicate with other system components across a network which may be a wireless or various other networks. It should be noted that one or more components of computing device 1400 may be located remotely and accessed via a network. Accordingly, the system configuration provided in FIG. 14 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1420 performs steps or executes program instructions 1412 within memory 1410 and/or embodied on the carrier to implement method embodiments. Further, embodiments may reside and execute on a mobile communication device such as a cellular telephone or Smartphone.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

While embodiments have been described with respect to identifying candidate electronic transaction data using a plug-in or a consumer selecting data of a software application to be added to a receipt database, it should be understood that the plug-in can be used to scan various numbers of and types of data elements of a software application.

For example, while examples involving displayed or stored candidate receipt data are provided to illustrate how embodiments may be implemented, it may be the case that only a small portion of software application pages, screens or e-mail messages have candidate electronic receipt data. For example, the plug-in may scan hundreds or thousands of screens, pages and e-mails, and monitor this data in real time as it is displayed, generated, received and/or stored, e.g., as the consumer browses or views the screens to surf the net. Accordingly, figures that illustrate electronic receipt data within a page or screen or electronic mail message are provided to illustrate how content generated by the software application can trigger a message, with the understanding that such triggers may occur only occasionally such that only a portion of all of the pages, screens or e-mail messages scanned by the plug-in will be brought to the attention of the consumer.

Further, while certain embodiments are described with reference to a receipt program such as QUICKRECEIPTS and a plug-in downloadable from a host computer, embodiments may also be implemented by or using other add-ons to a software application and other receipt programs, which may also be desktop or on-line programs. The plug-in may be downloaded from the host computer or another source. Further, while embodiments are described with reference to an individual consumer, embodiments may also be applied to multiple consumers, which may be individual and/or business consumers. Thus, the plug-in can be used to analyze data displayed or stored by software applications of one or multiple consumers, and the receipt database may include receipt data of hundreds and thousands of different consumers, each of which may purchase goods or services from various merchants, the receipt data from which may be detected by embodiments and transmitted from a consumer computer to the host computer.

Additionally, the plug-in can analyze data to identify candidate receipt data generated in response to various types of payments including, but not limited to credit card, debit card, check, electronic check, ATM withdrawal, ACH and other forms of electronic transactions.

Moreover, while embodiments are described with reference to identifying electronic receipt data generated by non-participating merchants, embodiments may also be utilized to identify electronic receipt data that is also sent to the host computer to serve as an additional check to ensure that the electronic receipt data is stored in the receipt database.

Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially.

For example, while certain embodiments are described with reference to scanning or reading displayed pages of a web browser, client e-mail application or other software application, the plug-in may scan or read data of closed files that are not displayed to the consumer, e.g., upon initial activation of the plug-in, the plug-in may scan stored e-mails. Additionally, in embodiments involving feedback or a smart or intelligent plug-in, the feedback analysis and resulting changes to pre-determined criteria may occur before, after or in parallel with other method steps.

Accordingly, embodiments are intended to exemplify alternatives, modifications, and equivalents that may fall within the scope of the claims.

What is claimed is:

1. A computer-implemented method for identifying electronic receipt data for inclusion in a receipt database comprising respective receipt data of respective consumers that is collected, stored and organized by a receipt program executing on a host computer, the method being performed by a computer and comprising:
   receiving data from an electronic mail application executing on a computing apparatus of a consumer as a first input to an add-on program to the electronic mail application, the add-on program being operable to communicate with the receipt program;
   in response to a request by the consumer, the add-on program scanning at least one closed electronic mail message to identify candidate electronic receipt data within the at least one closed electronic mail message; and
   receiving a second input to the add-on program indicating whether the identified candidate electronic receipt data should be stored in the receipt database.

2. The method of claim 1, the electronic mail application comprising a web-based electronic mail application providing access to an electronic mail account through a web browser, the add-on program comprising a plug-in to the web browser.

3. The method of claim 1, the electronic mail application comprising a client electronic mail application executing on the consumer computing apparatus, the add-on program comprising a plug-in to the client electronic mail application.

4. The method of claim 1, further comprising the add-on program identifying additional candidate electronic receipt data within an opened electronic mail message displayed by the electronic mail application on a screen of the consumer computing apparatus.

5. The method of claim 1, the add-on program identifying candidate electronic receipt data within multiple closed electronic mail messages.

6. The method of claim 1, the add-on program scanning closed electronic mail messages within a plurality of folders of the electronic mail application to identify candidate electronic receipt data within at least one closed electronic mail message in at least one folder.

7. The method of claim 1, the add-on program periodically scanning closed electronic mail messages to identify candidate electronic receipt data.

8. The method of claim 1, the second input indicating that the identified candidate electronic receipt data should be stored to the receipt database, the method further comprising:
   transmitting the identified candidate electronic receipt data from the consumer computing apparatus to the host computer through a network; and
   storing the identified candidate electronic receipt data in the receipt database using the receipt program.

9. The method of claim 1, wherein the identified candidate electronic receipt data was generated by a computing apparatus or electronic payment processing device of a merchant and transmitted from the merchant computing apparatus or electronic payment processing device to the consumer computing apparatus as confirmation of a purchase by the consumer from the merchant.

10. The method of claim 1, the add-on program comprising a feedback mechanism such that if the second input indicates that the identified candidate electronic receipt data should not be stored to the receipt database, the add-on program is programmed to disregard the same electronic receipt data in a future electronic mail message such that the add-on program does not display a message presenting the consumer with an option of storing the identified candidate electronic receipt data in the future electronic mail message to the receipt database.

11. The method of claim 1, the add-on program executing on a consumer computing apparatus comprising a mobile communication device capable of wireless or cellular communications with the host computer.

12. The method of claim 1, the add-on program receiving the first input in real time during an electronic transaction.

13. The method of claim 12, the add-on program receiving the second input in real time during the electronic transaction.

14. The method of claim 1, the add-on program identifying candidate electronic receipt data by:
   comparing the first input and pre-determined criteria; and
   determining whether the first input comprises candidate electronic receipt data based on least in part upon the comparison.

15. The method of claim 14, the pre-determined criteria being selected from the group consisting of at least one of pre-determined words, phrases, sequences of numbers, logos and images within the electronic mail message.

16. The method of claim 1, the add-on program identifying candidate electronic receipt data within the at least one closed electronic mail message based at least in part upon a pre-determined sequence of characters or numbers within the at least one closed electronic mail message identifying an electronic payment card.

17. The method of claim 1, further comprising the add-on program displaying a message on a screen of the consumer computing apparatus to notify the consumer of the identified candidate electronic receipt data, the message presenting the consumer with an option of storing the identified candidate electronic receipt data to the receipt database.

18. A computer-implemented method for identifying electronic receipt data for inclusion in a receipt database comprising respective receipt data of respective consumers that is collected, stored and organized by a receipt program executing on a host computer, the method being performed by a computer and comprising:
displaying an input element within a user interface generated by an electronic mail application, the input element being generated by an add-on program to the electronic mail application;
receiving an input to the add-on program resulting from the consumer clicking on the input element to request the add-on program to identify electronic receipt data within at least one closed electronic mail message that should be stored to the receipt database;
identifying electronic receipt data and transmitting the identified electronic receipt data from the consumer computing apparatus to the host computer through a network; and
storing the identified electronic receipt data in the receipt database using the receipt program.

19. The method of claim 18, the input element comprising a component of a toolbar displayed by the electronic mail application, the input element being selectable by the consumer utilizing an input device of the consumer computing apparatus.

20. The method of claim 18, the input element being selected from the group consisting of a menu, an icon or and a button.

21. The method of claim 18, the electronic mail application comprising a web-based electronic mail application providing access to an electronic mail account through a web browser, and the add-on program comprising a plug-in to the web browser.

22. The method of claim 18, the electronic mail application comprising a client electronic mail application executing on the consumer computing apparatus, and the add-on program comprising a plug-in to the client electronic mail application.

23. The method of claim 18, further comprising the add-on program identifying additional electronic receipt data within an opened electronic mail message displayed by the electronic mail application on a screen of the consumer computing apparatus.

24. The method of claim 18, the add-on program identifying receipt data within multiple closed electronic mail messages.

25. The method of claim 18, the add-on program scanning closed electronic mail messages within a plurality of folders of the electronic mail application to identify electronic receipt data.

26. The method of claim 18, the add-on program periodically scanning closed electronic mail messages to identify electronic receipt data.

27. The method of claim 18, wherein the closed e-mail message was sent by a computing apparatus or electronic payment processing device of a merchant to the consumer computing apparatus as confirmation of a purchase by the consumer from the merchant.

28. The method of claim 18, the add-on program executing on a consumer computing apparatus comprising a mobile communication device capable of wireless or cellular communications with the host computer.

29. The method of claim 18, the add-on program identifying electronic receipt data by:
comparing data of an electronic mail message and pre-determined criteria; and
determining whether the electronic mail message includes electronic receipt data based on least in part upon the comparison.

30. The method of claim 29, the pre-determined criteria being selected from the group consisting of at least one of pre-determined words, phrases, sequences of numbers, logos and images within the electronic mail message.

31. The method of claim 29, the add-on program identifying electronic receipt data based at least in part upon a pre-determined sequence of characters or numbers within the electronic mail message identifying an electronic payment card.

32. An article of manufacture comprising a non-transitory computer program medium readable by a computer and embodying instructions executable by the computer to perform a process for identifying electronic receipt data for inclusion in a receipt database including respective receipt data of respective consumers that is collected, stored and organized by a receipt program executing on a host computer, the process comprising:
receiving data from an electronic mail application executing on a computing apparatus of a consumer as a first input;
in response to a request by the consumer, scanning at least one closed electronic mail message to identify candidate electronic receipt data within the at least one closed electronic mail message; and
receiving a second input indicating whether the identified candidate electronic receipt data should be stored in the receipt database.

33. An article of manufacture comprising a non-transitory computer program medium readable by a computer and embodying instructions executable by the computer to perform a process for identifying electronic receipt data for inclusion in a receipt database comprising respective receipt data of respective consumers that is collected, stored and organized by a receipt program executing on a host computer, the process comprising:
displaying an input element within a user interface generated by an electronic mail application;
receiving an input resulting from the consumer clicking on the input element to request identification of electronic receipt data within at least one closed electronic mail message that should be stored to the receipt database;
identifying electronic receipt data transmitting the identified electronic receipt data from the consumer computing apparatus to the host computer through a network; and
storing the identified electronic receipt data in the receipt database using the receipt program.

* * * * *